Feb. 21, 1956 B. G. FAGERBERG 2,735,550
METHOD AND DEVICE FOR MAGNETIC FILTRATION
Filed Jan. 4, 1952 2 Sheets-Sheet 1
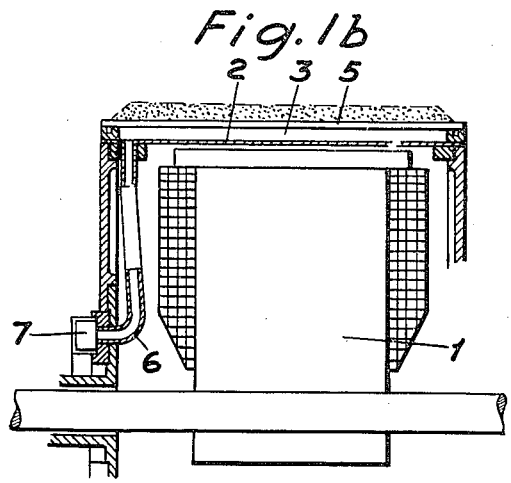
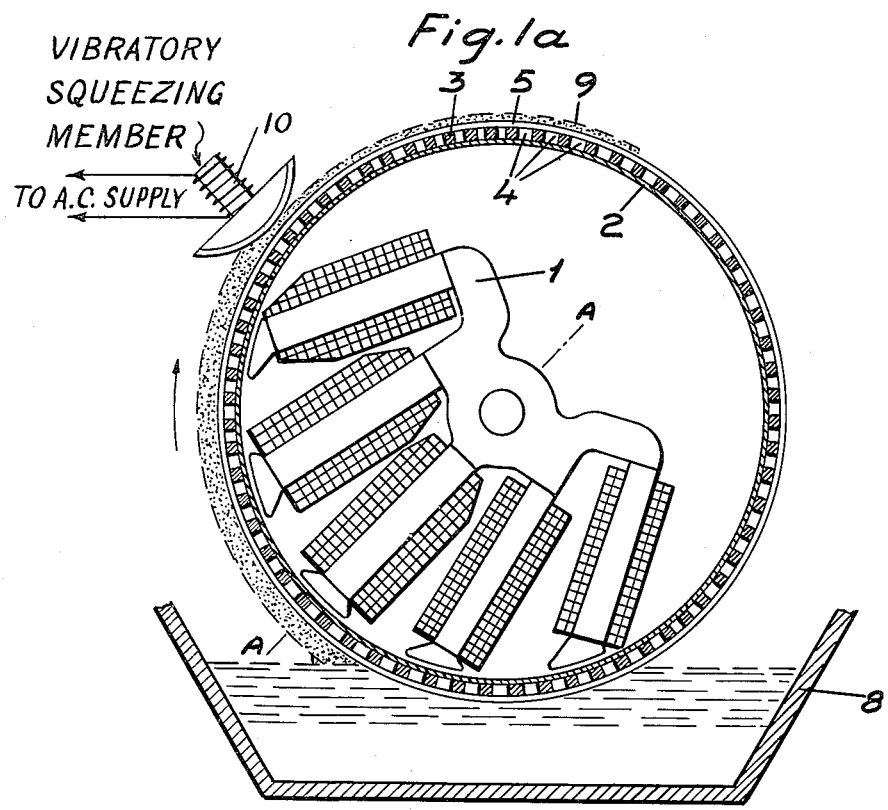
Bengt Georg Fagerberg
INVENTOR
his ATTYS.

Feb. 21, 1956   B. G. FAGERBERG   2,735,550
METHOD AND DEVICE FOR MAGNETIC FILTRATION
Filed Jan. 4, 1952   2 Sheets-Sheet 2
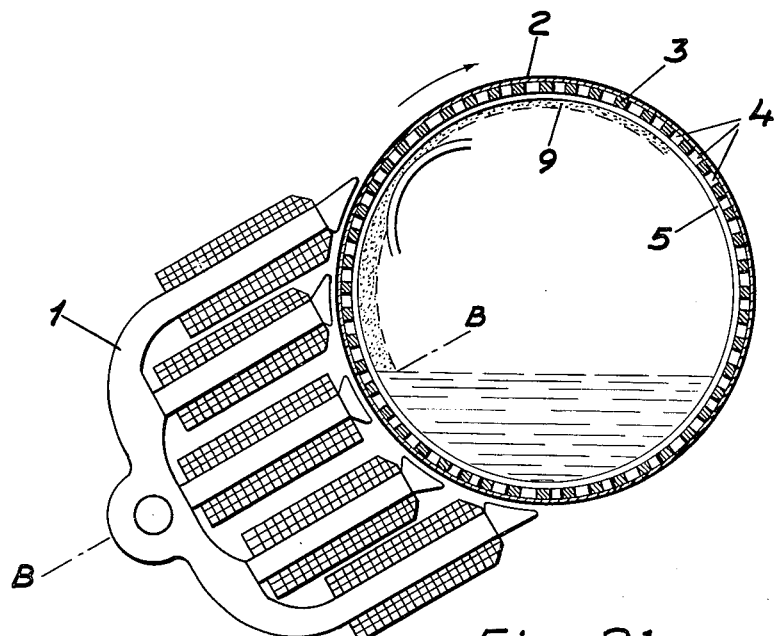
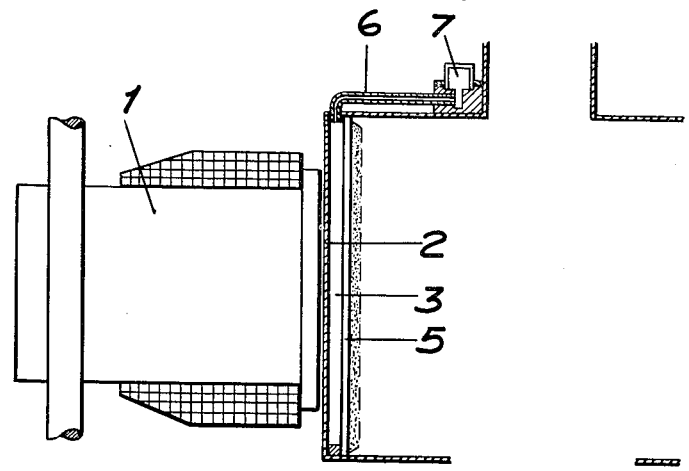
Bengt Georg Fagerberg
INVENTOR United States Patent Office 2,735,550
Patented Feb. 21, 1956

2,735,550
METHOD AND DEVICE FOR MAGNETIC FILTRATION

Bengt G. Fagerberg, Malmberget, Sweden, assignor to Sala Maskinfabriks A. B., Sala, Sweden Application January 4, 1952, Serial No. 264,899

10 Claims. (Cl. 210—1.5)

When separating solids from liquids it is known to use filtration by vacuum characterized in that that the mixture which is to be filtered, is placed on one side of a porous filter medium, while vacuum is produced on the other side. However, it has been proved that continuously working filters constructed according to this principle do not operate very effectively in certain cases. This is particularly the case, when the sediments or particles of solids held on the filter medium are of such a nature that they cannot be retained merely by the difference between the air pressure on opposite sides of the filter medium. Vacuum filtration is also made more difficult under certain circumstances, for example, when pulp, which is to be filtered, is composed of particles which have a strong tendency to be deposited from the pulp. Usual types of vacuum filters also have the disadvantage that the capacity of the filters is restricted in that that the liquid which is to be removed, must pass through the filter medium.

The present invention which relates to a method and an apparatus for filtering liquids from magnetic solids held in suspension in a liquid, has for its object to overcome the above-mentioned disadvantages in the common types of vacuum filters. The invention is substantially characterized in that, this filtering action by vacuum filtration through a rotating filtering cylinder is combined with the action of a magnetic field which attracts the magnetic particles of the solids and retains them against the filter medium.

The apparatus according to the principle of the invention can be made in a plurality of ways. In the accompanying drawings two embodiments according to the invention are shown. One embodiment is illustrated in Figs. 1a and 1b and the other embodiment in Figs. 2a and 2b. Fig. 1b shows a section along the line A—A in Fig. 1a and Fig. 2b shows a section along the line B—B in Fig. 2a.

In Figs. 1a and 1b a set of magnets 1 is placed in a hollow rotatable drum 2. Said drum is exteriorly provided with spaced peripheral supporting members 3 which extend parallel to the axis of rotation of drum 2 and which provide peripheral pressure chambers 4 between adjacent supporting members 3. The supporting members 3 support a porous filter member 5. The peripheral pressure chambers 4 are in communication with a vacuum pump or other pressure device via tubes 6 and a fixed circular slide member 7. Air pressure and flushing liquid can also be conducted into the peripheral pressure chambers 4 via the slide 7 and the tubes 6 for cleaning the filter member 5. The filter drum 2 is partially immersed in a trough 8 into which the pulp or other liquid suspension which is to be filtered, is conducted. The magnetic solid particles are attracted by the electro- or permanent magnets 1 and are retained against the filter member 5, both magnetically and by air pressure, the liquid accompanying the solid particles being rapidly removed by the vacuum. The sediment 9 which then is formed, is compressed at a suitable point by means of one or more suitable vibrating mediums or squeezing means 10, whereby a suitable consistency of the solid for the filtration is obtained. The said squeezing means 10 may consist of a rotatable roller or a vibrating member driven by an alternating current electro-magnet. The location of the set of magnets 1 may obviously be varied to suit conditions by turning it on its shaft or with it. The shape of the pole pieces and other details of construction may also be varied as desired. In the embodiment of the invention illustrated in Figs. 1a and 1b, the magnets 1 are stationary electromagnets provided with cores and with windings shown in section. The pole faces at the ends of the cores are of cylindrical configuration to conform closely to the shape of the internal surface of the filter drum 2. The filter drum 2 rotates in the direction of the arrow, the magnets being stationary.

As the lower surface of the rotating filter drum 2 passes through the liquid in the trough 8, the combined action of the magnets 1 and of the suction applied to the inner surface of the porous filter member 5 draws the magnetic particles from the liquid and holds them against the filter member 5. The magnetic attractive force is shown supplementing the force of the air pressure acting on the upwardly moving particles up to the portion of the drum 2 which is engaged by the vibratory squeezing means 10.

It will be noted that means 10 may obviously be formed as a complete roller or only a segment thereof as shown, but in either case this roller surface is caused to squeeze the liquid thoroughly from the pulp layer of magnetic material after the major portion of the liquid held by capillarity in the pulp has been drawn off by the suction means or drained off into the trough 8 as it emerged from the surface of the liquid or passed any flushing liquid means that might be used above this surface. The roller squeezing action is vibratory so that the layer of pulp will not tend to shift peripherally on the filter member 5 and thereby be loosened and piled up, but will remain coherent and evenly well caked, while being divested of its remaining liquid. Thus, a maximum amount of the filtered liquid may be recovered. The vibratory action of the roller provides a packing effect without any significant tangential shifting of the outer part of the pulp layer, because the piling up, if any, may be broken up in very minute intervals resulting in a substantially continuously smooth surface of the dehydrated and compacted or caked layer emerging from the roller position on the drum for final dehydration by air sucked through it, and for easy removal in one compact layer from the filter cylinder.

In Figs. 2a and 2b another embodiment of the device is shown, in which the magnetic set is placed outside the drum 2 and the filter member 5 is supported at the inside of the drum. The corresponding details are provided with the same reference numerals as in Figs. 1a and 1b.

Having now described my invention, what I claim as new and desire to secure by Letters Patent is:

1. A filtering device of the class described, comprising: a revoluble hollow drum; a porous circumferentially extending filter member carried by said drum; means for producing an air pressure differential on opposite sides of said filter member by providing a suction space at one side of said filter member; and magnet means disposed in proximity to said filter member on said one side for augmenting the action of said pressure differential for urging magnetic particles to be drawn to said filter member.

2. A filtering device according to claim 1, in which said filter member is of cylindrical configuration, and further comprising squeezing means positioned in close proximity to said filter member for squeezing liquid from material to be filtered, magnetic solid particles in said material being held against said filter member during the action of said squeezing means both by said pressure differential and by said magnet means.

3. A filtering device according to claim 2 in which said squeezing means comprises a vibratory member.

4. A filtering device according to claim 2 in which said squeezing means comprises roller means having an axis of rotation parallel to the axis of rotation of said hollow drum.

5. A filtering device of the class described, comprising: a revoluble hollow drum having a cylindrical lateral wall; a plurality of spaced supporting members carried by said lateral wall; a hollow cylindrical porous filter member carried by said supporting members, said spaced supporting members forming suction chambers therebetween; suction means communicating with said suction chambers for producing an air pressure differential on opposite sides of said filter member; means for delivering a liquid suspension of solid magnetic particles to be filtered to the high pressure side of the lower portion of said filter member; and magnet means disposed in proximity to the low pressure side of said filter member and producing a magnetic force urging said particles toward said high pressure side of said filter member, whereby particles which are too coarse to be held against said filter member by said pressure differential acting alone are held there-against by the combined action of said pressure differential and said magnetic force.

6. A filtering device according to claim 5 in which said filter member and said supporting members are disposed exteriorly of said hollow drum, and said magnet means is disposed interiorly thereof.

7. A filtering device according to claim 5 in which said filter member and said supporting members are disposed interiorly of said drum, and said magnet means is disposed exteriorly thereof.

8. A filtering device according to claim 5, further comprising squeezing means positioned in close proximity to said filter member for squeezing said liquid from said suspension.

9. A filtering device according to claim 8, in which said squeezing means comprises a vibratory member.

10. A filtering device according to claim 8 in which said squeezing means comprises roller means having an axis of rotation parallel to the axis of rotation of said hollow drum.

References Cited in the file of this patent

UNITED STATES PATENTS

| | | |
|---|---|---|
| 1,683,780 | Hulsmeyer | Sept. 11, 1928 |
| 2,449,902 | Kiersted, Jr. | Sept. 21, 1948 |
| 2,466,839 | Caldwell | Apr. 12, 1949 |
| 2,564,515 | Vogel | Aug. 14, 1951 |